Aug. 30, 1955   L. L. FIKE   2,716,506
RUPTURE DISC ASSEMBLY FOR HIGH PRESSURE VESSELS
Filed Jan. 16, 1953
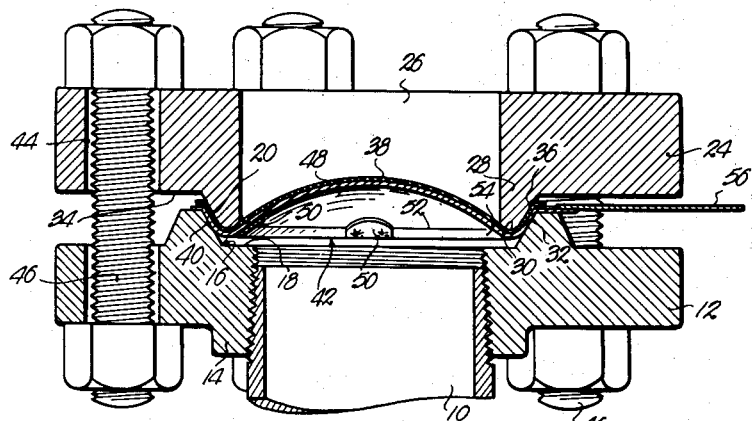
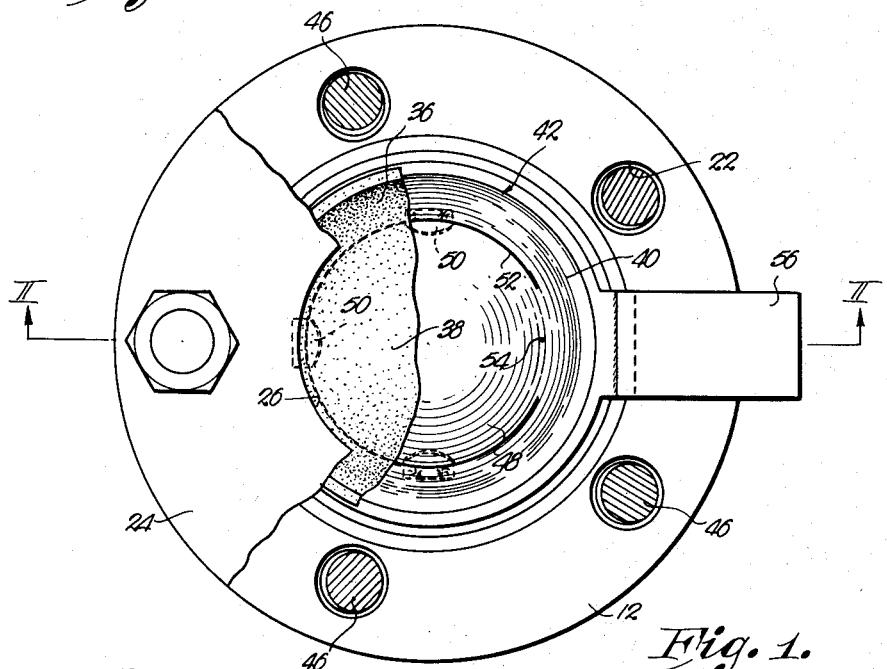
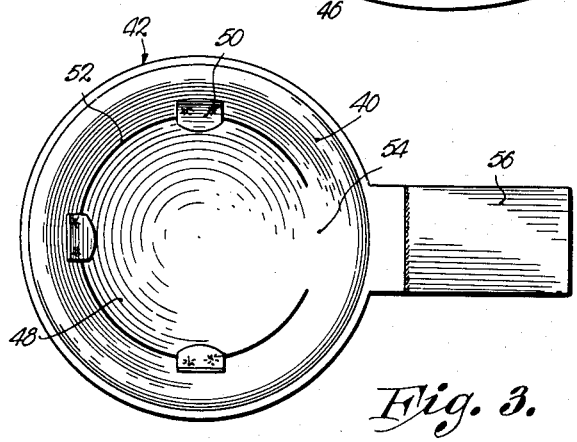
INVENTOR.
Lester L. Fike
BY
ATTORNEY

United States Patent Office 2,716,506
Patented Aug. 30, 1955

2,716,506

RUPTURE DISC ASSEMBLY FOR HIGH PRESSURE VESSELS

Lester L. Fike, Independence, Mo., assignor to L. L. Fike Metal Products Co., Independence, Mo.

Application January 16, 1953, Serial No. 331,591

4 Claims. (Cl. 220—89)

This invention relates to safety pressure devices, frequently referred to as safety heads, which are used in the protection of pressure vessels and various other equipment wherein dangerous pressures may occur. Such devices include a dome-shaped, frangible diaphragm designed to rupture at a predetermined pressure differential. Diaphragms of this character are usually positioned between the high and low pressure sides, with the high pressure acting upon the concave face of the diaphragm, so that should the pressure rise toward the danger point, the diaphragm ruptures at the predetermined pressure for which it was designed, thereby relieving the excessive pressure.

In many installations such diaphragms are completely satisfactory, but when the operating conditions are such that the pressure on the concave side of the diaphragm drops below the pressure on the convex side, the diaphragm may reverse its form and be distorted so that it is weakened to such an extent that when the pressure again appears, the diaphragm will burst far below its rated rupture pressure.

It is the primary object of this invention, therefore, to provide a safety device of this character with means for preventing collapse of the diaphragm in case the system is subjected to greater pressure on the external side of the diaphragm than the pressure on the internal side.

Another important object of this invention is the provision of structure for preventing the diaphragm from buckling and therefore bursting, in response to pressures on one side of the diaphragm and/or suction on the opposite side thereof, and including a member so disposed adjacent the diaphragm as to prevent its collapsing in one direction, and adapted to move to a position clearing the relief opening in which it is mounted when the diaphragm ruptures to relieve excess pressure in the vessel with which the safety device is associated.

Other objects include the way in which the supporting or holding member for the diaphragm is hingedly mounted on an annulus; the manner in which the diaphragm supporting member is hingedly joined to the annulus by an integral line of bend; the way in which the annulus is provided with ears for supporting the member against swinging movement in the direction away from the diaphragm; the manner of forming the member for complemental seating within the concave face of the diaphragm; the way in which the diaphragm is provided with a flange that is clamped in place with the annulus; and many other more minor objects, including important details of construction, all of which will be made clear or become apparent as the following specification progresses.

In the drawing:

Figure 1 is a plan view of a rupture disc assembly for high pressure vessels made pursuant to the present invention, parts being broken away and in section for clearness.

Fig. 2 is a cross-sectional view, taken on line II—II of Fig. 1; and

Fig. 3 is an inverted view of the diaphragm support, entirely removed from its operating position associated with the diaphragm.

The safety device includes a nipple 10 adapted for connection with a high pressure vessel (not shown) and externally threaded on its upper end to secure a ring-shaped seat or clamping member 12. The ring member 12 has a depending, internally threaded flange 14 for engaging the threads of the nipple 10, and a peripheral seat 16 formed in the upper face of the ring member 12 has a horizontal portion 18 terminating in an upwardly inclined, annular wall 20. Ring member 12 extends radially beyond the seat 16 and is provided with a series of openings 22.

Associated with the ring seat 16 is a clamping ring 24 having a vertical inner wall 26 aligning with the nipple 10 and having a depending, annular clamping or rib portion 28. Clamping portion 28 of the ring 24 corresponds in shape to the seat 16 and includes a rounded portion 30 and an annular, inclined face portion 32 having substantially the same angle of inclination as that of the annular wall 20 of ring 12. From the clamping portion 28, the lower face of the ring 24 is recessed, as at 34, to provide clearance for the surplus metal, rubber, plastic or other material of annular flange 36 on dome-shaped or concavo-convex, frangible diaphragm 38 and on annulus 40 of a supporting device 42 for the diaphragm 38. Ring 24 is also provided with openings 44 aligning with the openings 22 in the ring 12, through which fasteners, such as bolts 46, may be projected to clamp the rings 12 and 24 together and to clamp the diaphragm 38 and the supporting device 42 in place.

Frangible diaphragm 38 normally closes the relief opening formed by the inner diameters of the rings 12 and 24, and is adapted to fracture in case of excessive pressure within the vessel to which the nipple 10 is connected. It is to be noted that the annular, integral anchoring flange 36 of the diaphragm 38 extends from the latter in a reverse curve from that of the frangible, dome-shaped portion of the diaphragm 38, and thence outwardly in a plane substantially parallel with the surface 34 of ring 24.

If the vessel is subjected to a greater external pressure than the contained pressure, the diaphragm 38 tends to buckle inwardly incidental to the greater external pressures acting on the outer surface of the diaphragm 38, and in order to overcome this action on the diaphragm 38, the supporting device 42 is provided to sustain the diaphragm 38. The supporting device 42 includes, in addition to the annulus 40, a dome-shaped or concavo-convex member 48 that is complemental with the shape of the diaphragm 38 and adapted to seat within the concave face of the latter, as shown in Fig. 2. Member 48, which is surrounded by the annulus 40, is supported in engagement with the diaphragm 38 through the provision of parts on the annulus 40 taking the form of a plurality of ears 50 secured to the annulus 40. As shown, ears 50 are welded directly to the annulus 40, but may be attached thereto in any other suitable manner.

In order to provide for relief of pressure without destructive reactions to the vessel and hazards caused by wildly flying fragments of the safety device after it has operated, the member 48 is preferably hinged to the element or annulus 40 in some suitable manner, so that when the internal pressures exceed the predetermined value in relation to the external pressure, the diaphragm 38 will disrupt to allow relief of pressure through the opening 26 and the member 48 will swing away from the ears 50 to a position clearing the relief opening. A preferred form of hinge mounting is illustrated and accomplished by providing an arcuate slot 52 in the device 42, setting off the member 48 and the annulus 40 and presenting a line of bend 54 between the ends of arcuate slot 52. It is to be preferred that the slot 52 be substantially larger than a semicircle, so that the member 48 will swing on the line of bend 54 in hinge-like manner substantially clear of the relief opening. Accordingly, the ears 50 are disposed to traverse the slot 52, as is clear in the drawing.

The annulus 40, serving as a support for the member 48 through integral connection 54 and through ears 50, is conveniently mounted to hold the member 48 properly in place, seated within the diaphragm 38, by being disposed between the inclined wall 20 of ring 12 and the annular flange 36 of diaphragm 38, whereby when the bolts 46 are drawn tight, the rings 12 and 24 clamp both the diaphragm 38 and the supporting device 42 in place within the relief opening of the safety device.

Conceivably, the member 48 may be separate from the annulus 40 by continuing the slot 52 into a full circle, thereby eliminating the line of bend 54, and the member 48 supported entirely by radial ears 50. However, as above indicated, a hazard would thereby be presented when the pressure within the vessel disrupted the diaphragm 38 and projected the member 48 through the opening 26 and therebeyond.

The slot 52 provides clearance for increased pressures within the vessel to act upon the diaphragm 38, whereby the same fractures to allow relief of pressure, whereupon the member 48 swings out of the way as aforesaid. Suction within the vessel and/or external pressure acting on the diaphragm 38 will not, however, adversely affect the diaphragm 38 so far as inward buckling or collapsing is concerned. The lateral extension 56 on the annulus 40, shown in the drawing, is for the purpose of presenting a name plate and is not essential to the operation of the diaphragm supporting device 42.

Having thus described the invention, what is claimed as new and desired to be secured by Letters Patent is:

1. In a safety device for pressure systems having a relief opening, a frangible, concavo-convex diaphragm yieldably responsive to pressures and suctions acting thereon, and means mounting said diaphragm in sealed relation with said opening, the improvement of which comprises structure for preventing said diaphragm from buckling in one direction and bursting in response to pressure acting thereon on the convex side thereof and suction acting thereon on the concave side thereof, said structure including a device of bendable material having an arcuate slot, presenting a rigid, concavo-convex member and a rigid annulus surrounding the member and integrally joined thereto along a single line of bend between the ends of the slot for swinging movement of the member relative to the annulus on said line of bend, the convex side of said member being disposed in complementally seated engagement with said diaphragm on said concave side of the diaphragm for swinging movement on said line of bend in a direction toward the diaphragm in response to pressure on said concave side of the diaphragm; a number of inwardly extending ears on the annulus traversing the slot and engaging the member on its concave side for supportig the member against swinging movement on said line of bend in a direction away from the diaphragm in response to pressure on said convex side of the diaphragm and suction on said concave side of the diaphragm; and means rigidly mounting said annulus.

2. In the invention as set forth in claim 1, wherein said ears constitute the entire structure in engagement with the concave side of the member, and said diaphragm constitutes the entire structure in engagement with the convex side of the member.

3. In a safety device for pressure systems having a relief opening, a frangible diaphragm yieldably responsive to pressures and suctions acting thereon, and means mounting said diaphragm in sealed relation with said opening, the improvement of which comprises structure for preventing said diaphragm from buckling in one direction and bursting in response to pressure acting thereon on one side thereof and suction acting thereon on the opposite side thereof, said structure including a member disposed on said opposite side of the diaphragm and in engagement therewith for movement in a direction toward the diaphragm in response to pressure on said opposite side of the diaphragm; a rigid element having parts engaging the side of the member opposite the diaphragm for supporting the member against movement in a direction away from the diaphragm in response to pressure on said one side of the diaphragm and suction on said opposite side of the diaphragm; means rigidly mounting said element; and means hingedly connecting the member to said element for swinging movement of the member in said direction toward the diaphragm and away from said parts.

4. In the invention as set forth in claim 3, wherein said means hingedly connecting the member to said element comprises an integral joinder of the member and the element, said member constituting the entire central portion of an integral assembly including the member and the element, said central portion being swingable about a single line of bend between the member and the element.

References Cited in the file of this patent

UNITED STATES PATENTS

| | | |
|---|---|---|
| 2,523,068 | Simpson | Sept. 19, 1950 |
| 2,553,267 | Nedoh | May 15, 1951 |